(12) United States Patent
Tsukamoto

(10) Patent No.: US 7,370,024 B2
(45) Date of Patent: May 6, 2008

(54) CASE CLASSIFICATION APPARATUS AND METHOD

(75) Inventor: Koji Tsukamoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 158 days.

(21) Appl. No.: 11/133,414

(22) Filed: May 20, 2005

(65) Prior Publication Data

US 2005/0246300 A1  Nov. 3, 2005

Related U.S. Application Data

(63) Continuation of application No. PCT/JP03/03368, filed on Mar. 19, 2003.

(51) Int. Cl.
*G06F 17/00* (2006.01)
*G06N 5/02* (2006.01)

(52) U.S. Cl. .............................. 706/46; 706/47; 706/45

(58) Field of Classification Search .................. 706/46, 706/47, 45; 382/118
See application file for complete search history.

(56) References Cited

U.S. PATENT DOCUMENTS

| 5,845,048 | A * | 12/1998 | Masumoto ..................... 706/20 |
| 2001/0026634 | A1* | 10/2001 | Yamaguchi .................. 382/118 |
| 2003/0120649 | A1* | 6/2003 | Uchino et al. .................. 707/5 |
| 2003/0172349 | A1* | 9/2003 | Katayama et al. ........... 715/513 |
| 2005/0165566 | A1* | 7/2005 | Happel ......................... 702/66 |

FOREIGN PATENT DOCUMENTS

| EP | 0726531 | 8/1996 |
| JP | 9-26963 | 1/1997 |
| JP | 10-116290 | 5/1998 |
| JP | 10-254899 | 9/1998 |
| JP | 11-39313 | 2/1999 |
| JP | 11-316763 | 11/1999 |
| JP | 2000-181936 | 6/2000 |
| JP | 2000181936 | * 6/2000 |
| JP | 2000-250916 | * 9/2000 |
| JP | 2002-222083 | 8/2002 |
| WO | 99-14690 | 3/1999 |
| WO | WO9914690 | * 3/1999 |

OTHER PUBLICATIONS

Koji Tsukamoto, et al., "Text Categorization using Active Learning with AdaBoost", Information Processing Society of Japan (2001-NL-146), Nov. 20, 2001, vol. 2001, No. 112, pp. 81-88.

Y. Freund, et al., "A Short Introduction to Boosting", Journal of Japanese Society for Artificial Intelligence, Sep. 1, 1999, vol. 14, No. 5, pp. 771-780.

T. Joachims, et al., Text Categorization with Support Vector Machines: Learning with Many Relevant Features, 1998, obtained Apr. 14, 2003 from www.cs.cornell.edu/People/tj/Publications/joachims_98a.pdf>.

Hironobu Taira et al., "Text Categorization Using a Transductive Boosting Method", Information Processing Society of Japan (2000-NL-139) Sep. 22, 2000, vol. 2000, No. 86, pp. 69-76.

* cited by examiner

*Primary Examiner*—Joseph P Hirl
(74) *Attorney, Agent, or Firm*—Staas & Halsey LLP

(57) ABSTRACT

When classifying cases into categories of a category system, a classification rule is generated from information obtained from a set of cases classified into categories of another category system and the cases are classified according to the classification rule.

17 Claims, 25 Drawing Sheets

"CLASSIFICATION RULE GENERATOR FOR RECEIVING SET OF SOLUTION CASES (PAIR OF FEATURE VECTOR AND A CATEGORY) AND OUTPUTTING A CLASSIFICATION RULE, AND ⋯ FOR RECEIVING CASE REPRESENTED BY A FEATURE VECTOR ⋯ "

FIG. 2

| FEATURE (WORD) | NUMBER OF OCCURRENCES |
|---|---|
| SOLUTION | 3 |
| CASE | 6 |
| FEATURE | 10 |
| VERTICAL | 4 |
| CATEGORY | 17 |
| PAIR | 6 |
| SET | 8 |
| ⋮ | ⋮ |

FIG. 3

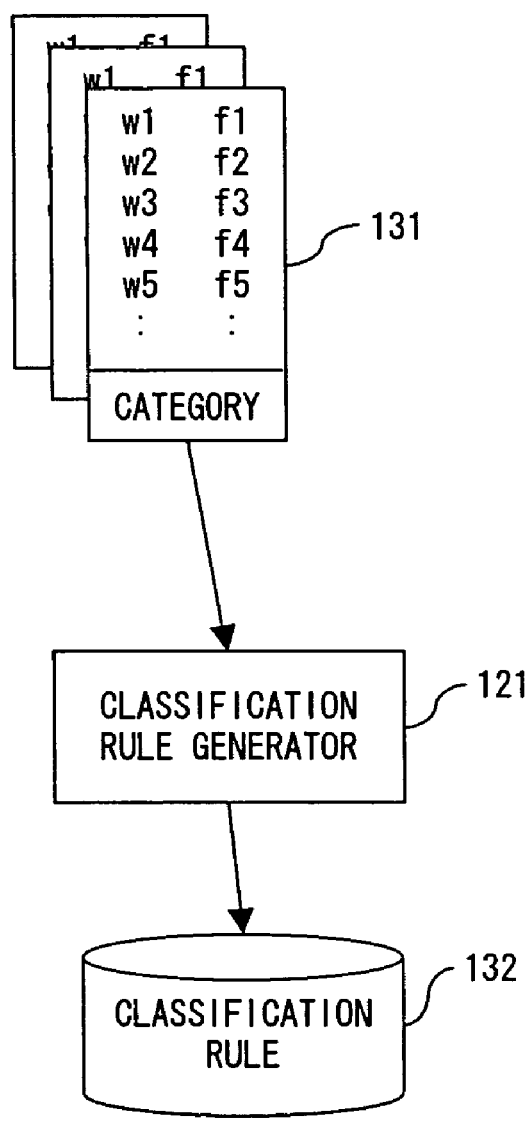
F I G. 4

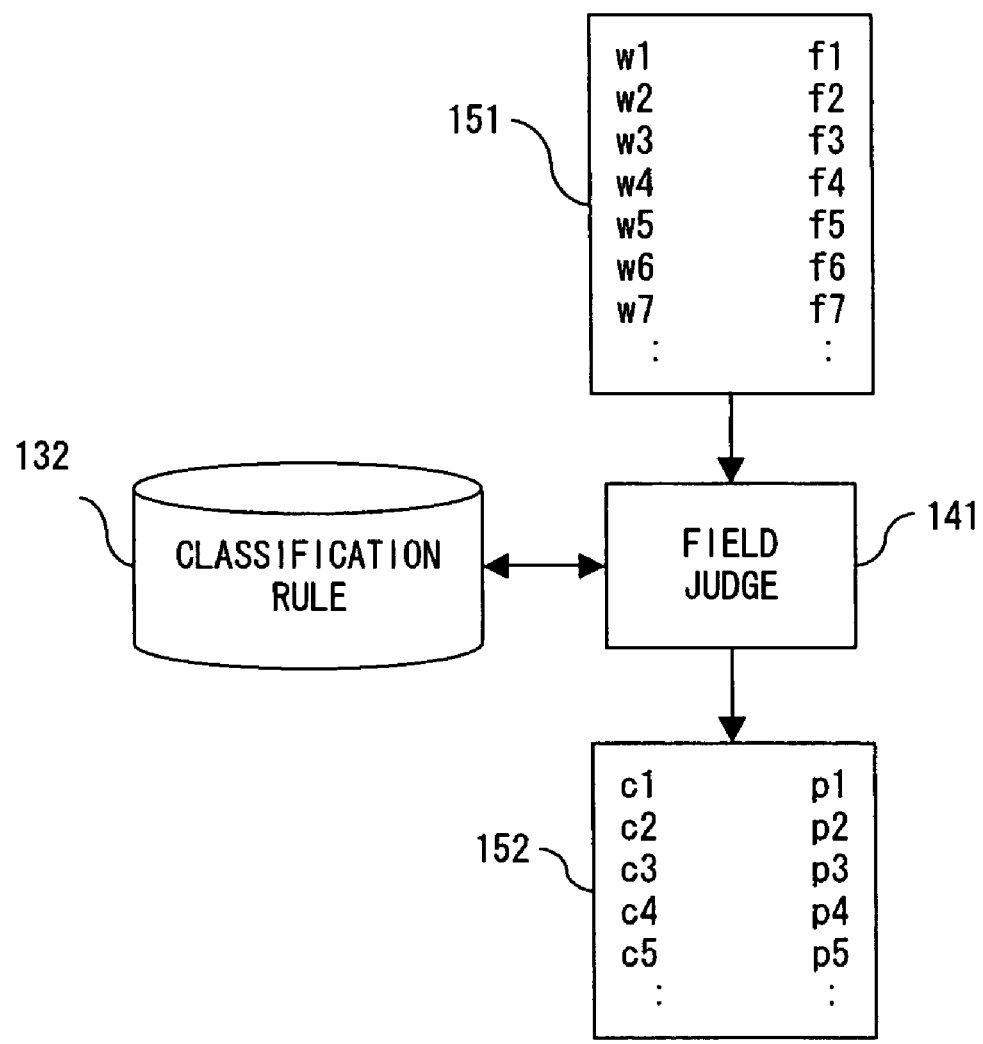
F I G. 6

| FEATURE (WORD) | NUMBER OF OCCURRENCES |
|---|---|
| SOLUTION | 3 |
| CASE | 6 |
| FEATURE | 10 |
| VECTOR | 4 |
| CATEGORY | 8 |
| ⋮ | ⋮ |

FIG. 7

| CATEGORY | CERTAINTY |
|---|---|
| SOFTWARE | 0.95 |
| DEVICE | 0.03 |
| INFORMATION PROCESSING | 0 |
| COMMUNICATION | 0 |
| FINANCING | 0.02 |

FIG. 8

|    | c1        | c2        | c3        | c4        | .. |
|----|-----------|-----------|-----------|-----------|----|
| w1 | score 1,1 | score 1,2 | score 1,3 | score 1,4 |    |
| w2 | score 2,1 | ...       | ...       | ...       |    |
| w3 | score 3,1 | ...       | ...       | ...       |    |
| w4 | score 4,1 | ...       | ...       | ...       |    |
| w5 | score 5,1 | ...       | ...       | ...       |    |
| w6 | score 6,1 | ...       | ...       | ...       |    |
| :  | :         | :         | :         | :         |    |

FIG. 12

| | A NECESSITIES OF LIFE | B PROCESSING OPERATION ; TRANSPORTATION | ... | H ELECTRICITY |
|---|---|---|---|---|
| "FERTILIZER" | 0.7 | 0.05 | ... | 0.01 |
| "SEPARATION" | 0.1 | 0.6 | ... | 0.2 |
| "OPERATION" | 0.1 | 0.3 | ... | 0.1 |
| "NITROGEN" | 0.1 | 0.02 | ... | 0.5 |
| "OPTICS" | 0.2 | 0.03 | ... | 0.8 |
| ... | ... | ... | ... | ... |

F I G. 1 3

| CATEGORY | EVALUATION VALUE |
|---|---|
| A NECESSITIES OF LIFE | 1.1 |
| B PROCESSING OPERATION; TRANSPORTATION | 2.7 |
| C CHEMISTRY, METALLURGY | 0.8 |
| D FIBER; PAPER | 0.2 |
| E FIXED STRUCTURE | 2.0 |
| F MECHANICAL ENGINEERING ; ILLUMINATION ; HEATING ; ARMS ; EXPLOSION | 3.1 |
| G PHYSICS | 0.9 |
| H ELECTRICITY | 3.8 |

F I G. 17

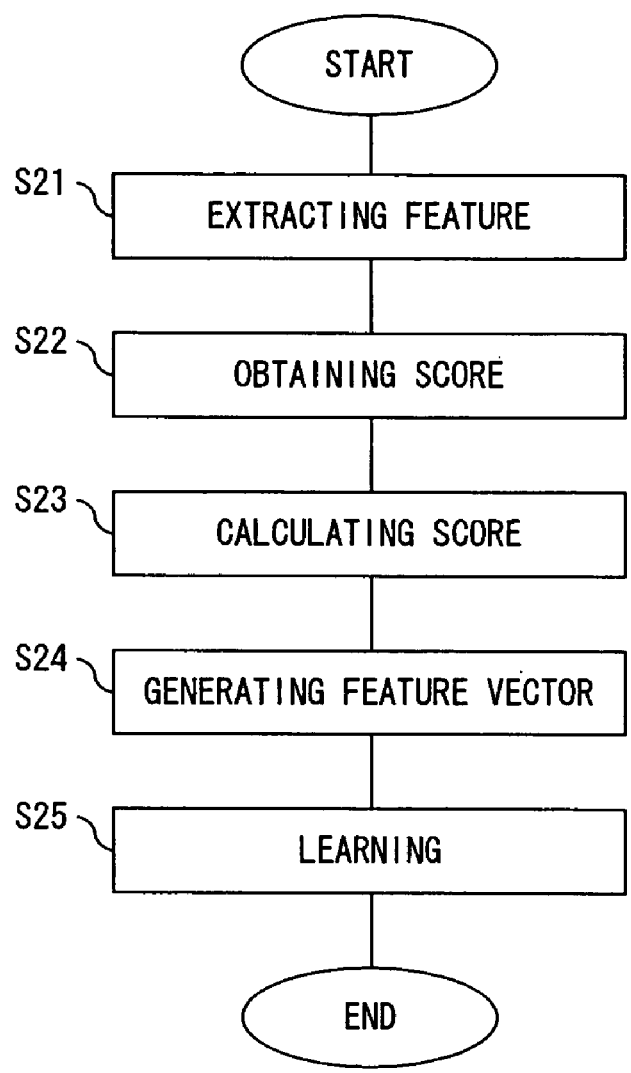
F I G. 1 9

| FEATURE (WORD) | CATEGORY | CORRELATION COEFFICIENT |
|---|---|---|
| MEMORY | SEMICONDUCTOR DEVICE | 0.5 |
| DUAL OPERATION FLASH MEMORY | SEMICONDUCTOR DEVICE | 0.93 |
| COOLING | SEMICONDUCTOR DEVICE | -0.7 |
| CTRANSPORTATION | SEMICONDUCTOR DEVICE | -0.3 |
| NETWORK | SEMICONDUCTOR DEVICE | -0.2 |
| MICROCOMPUTER | SEMICONDUCTOR DEVICE | 0.4 |

FIG. 20

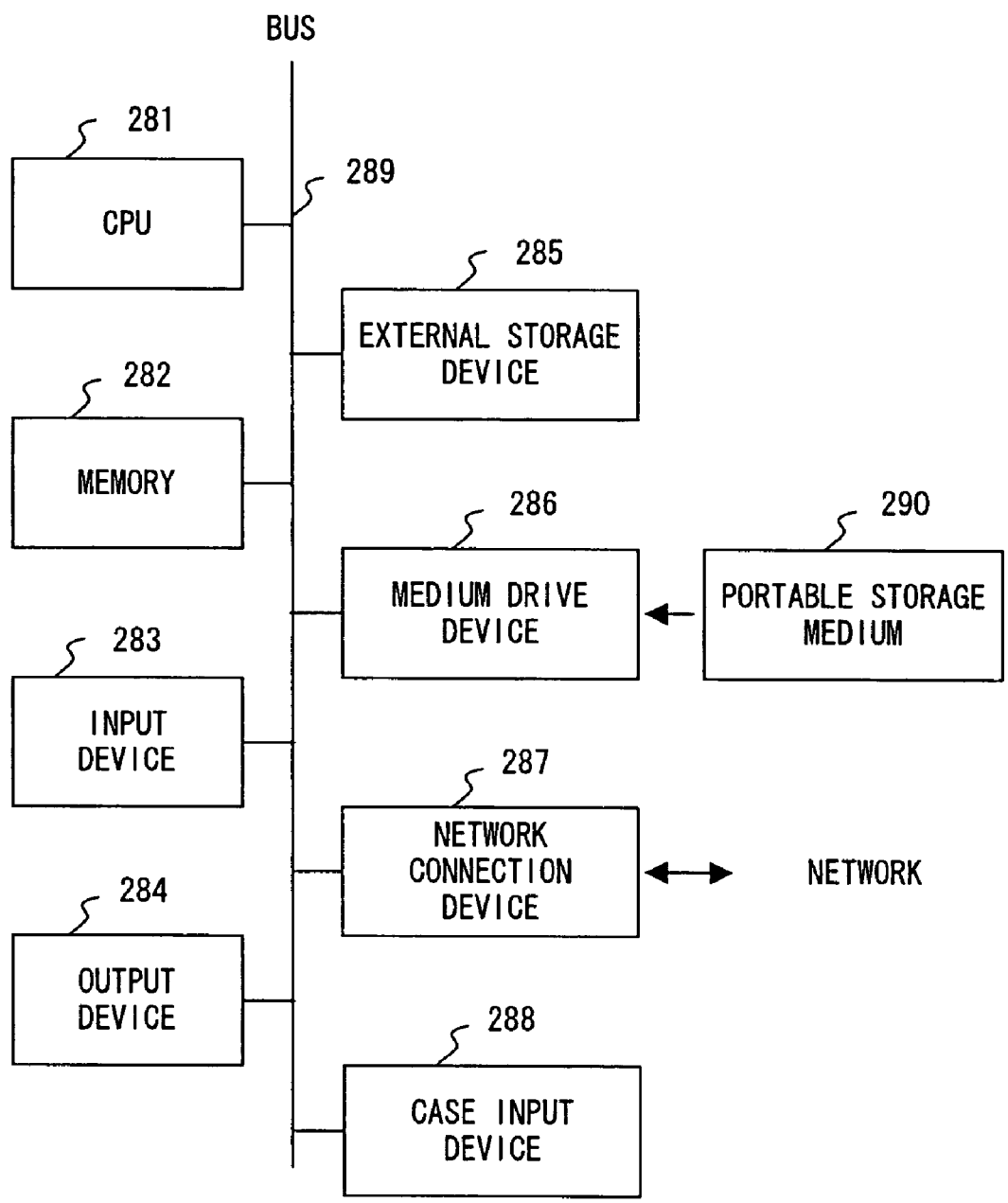
F I G. 24

CASE CLASSIFICATION APPARATUS AND METHOD

CROSS REFERENCE TO RELATED APPLICATION

This application is a continuation of international PCT application No. PCT/JP03/03368 filed on Mar. 19, 2003.

BACKGROUND OF THE INVENTION

1. Field of the Invention

The present invention relates to an apparatus and a method for classifying a given case into a corresponding category. The present invention is specifically used in fields such as automatically classifying a document, recognizing an image, etc. to classify a case into corresponding categories.

2. Description of the Related Art

When documents are classified in many conventional methods, solution cases (solution document groups) obtained by manually classifying cases (documents) are prepared in advance, and using the solution cases, unknown cases (unknown documents) are classified. In these methods, a feature extraction unit, a classification rule generator, and a field judge are frequently used.

FIG. 1 shows a feature extraction unit. A feature extraction unit 101 shown in FIG. 1 receives a case (document 111), and outputs a feature vector 112 (a vector indicating features of a document). In classifying a document, each word (characteristic word) in the document is defined as a dimension wi (i=1, 2, 3, ...) of a feature vector space, and the number of occurrences of each word as each element fi of a feature vector. For example, when a document as shown in FIG. 2 is input, a feature vector as shown in FIG. 3 is output.

FIG. 4 shows a classification rule generator. A classification rule generator 121 shown in FIG. 4 receives a set 131 of solution cases (pairs of feature vectors and categories) and outputs a classification rule 132.

The classification rule 132 is a rule for classifying cases represented by feature vectors into categories, and its format depends on the type of classification rule generator 121.

A vector model, a naïve Bayes classifier, a decision tree, a decision list, a support vector machine (SVM), boosting, etc. are proposed as the classification rule 132.

An input pair of a feature vector and a category is, for example, that shown in FIG. 5. In FIG. 5, a feature vector is associated with the category "software".

FIG. 6 shows a field judge. A field judge 141 receives a case represented by a feature vector 151, and obtains a list 152 of the certainty pi with which a case belongs to a category ci. For example, when the feature vector as shown in FIG. 7 is input, the certainty list as shown in FIG. 8 is output.

FIG. 9 shows a method of classifying an unknown case (document) using the above-mentioned feature extraction unit, classification rule generator, and field judge. A classification rule generation unit 161 shown in FIG. 9 includes the feature extraction unit 101 and the classification rule generator 121. A field judgment unit 162 shown in FIG. 9 includes the feature extraction unit 101 and the field judge 141.

First, a set 171 of solution cases (solution documents) classified into categories ($\alpha$, $\beta$, $\gamma$) of a category system S is input to the classification rule generation unit 161, and a set of feature vectors is generated by the feature extraction unit 101. The set of feature vectors is input to the classification rule generator 121, and the classification rule 132 is generated.

Then, an unknown case (unknown document 172) is input to the field judgment unit 162, and converted to a feature vector by the feature extraction unit 101, the feature vector is input to the field judge 141, and the certainty 173 with which the unknown document 172 belongs to each of the categories $\alpha$, $\beta$, and $\gamma$ is obtained.

There are a number of fields of application of the classification methods, and relating to document classification there are the following examples of methods of using a word as a feature of a document.

(1) A document is represented by a feature vector, and is classified by an SVM learning system (for example, refer to the non-patent literature 1).

(2) In addition to the above-mentioned system, the precision is improved by using adaptive feedback (for example, refer to the patent literature 1).

(3) For an unknown document, the correlation based on a word extracted from the documents of a specific category is compared with the correlation based on a word extracted from a common document, and it is determined whether or not an unknown document belongs to the specific category (for example, refer to the patent literature 2).

Relating to document classification, the method of using features other than words can be exemplified as follows.

(1) Using a conjunction, the precision can be improved (for example, refer to the patent literature 3).

(2) A portion encompassed by tags is extracted from an SGML (Standard Generalized Mark-up Language) document, and classification is performed using the extracted portion as a feature (for example, refer to the patent literature 4).

(3) The precision is improved by adding link information as a feature (for example, refer to the patent literature 5, 6, and 7).

(4) The precision is improved by learning with the semantic category of a word appearing in a document by using a thesaurus (for example, refer to the patent literature 8).

However, the above-mentioned conventional case classification methods have the following problems.

To classify a document into a specified category system, it is necessary to manually generate a sufficient number of solution documents in advance. The reason for low classification precision when there are a small number of solution documents is that features (words, etc.) appearing in an unknown document to be classified do not appear in a solution document. Since the number of occurrences of the feature is small although the feature appears and has no statistic meaning, the feature appearing in an unknown document to be valid cannot be used as a feature of judgment of a field.

For example, assume that an unknown document such as "among the nations . . . the NATO Summit and the attack against Iraq" is classified. When a word is a feature, the word "NATO" normally relates to "International", "Military", etc. However, when the conventional classifying method is used if there is no word "NATO" appearing in any solution document, the word "NATO" does not contribute as a feature in classifying the document. When there are a small number of solution documents, there are a number of cases in which a feature appearing in an unknown document does not appear in a solution document.

Additionally, although there is a method of performing classification by adding a conjunction, link information, etc.

as a feature in the above-mentioned conventional methods, if the feature appearing in an unknown document does not appear in a solution document because there are a small number of solution documents, precision is unaffected.

Furthermore, in the above-mentioned conventional methods, the method using a thesaurus excels in that a word not appearing in a solution document in the features of unknown documents contributes to the judgment of a field. However, it is not effective when a word not registered in a thesaurus appears in an unknown document to be classified. To support this case, it is necessary to prepare a comprehensive and expensive thesaurus.

Thus, in the conventional document classification methods, since a feature appearing in an unknown document rarely appears in a solution document when there are a small number of solution documents, there exist the problems that the classification precision is low, it is necessary to generate a dictionary at a high cost to improve the precision, etc.

Non-Patent Literature 1

Thorsten Joachims, "Text Categorization with Support Vector Machines: Learning with Many Relevant Features", [online], In Proceedings of the European Conference on Machine Learning, Springer, 1998, [retrieved on Feb. 17, 2003], Internet <URL, http://www.cs.cornell.edu/People/tj/publications/jo achims_98a.pdf>

Patent Literature 1
Japanese Patent Laid-open Publication No. Hei 09-026963

Patent Literature 2
Japanese Patent Laid-open Publication No. 2000-250916

Patent Literature 3
Japanese Patent Laid-open Publication No. Hei 11-316763

Patent Literature 4
Japanese Patent Laid-open Publication No. Hei 10-116290

Patent Literature 5
Japanese Patent Laid-open Publication No. 2000-181936

Patent Literature 6
International Publication No. 99/14690 pamphlet

Patent Literature 7
Japanese Patent Laid-open Publication No. Hei 10-254899

Patent Literature 8
Japanese Patent Laid-open Publication No. Hei 11-039313

SUMMARY OF THE INVENTION

The present invention aims at providing a case classification apparatus and a case classification method capable of classifying a case with high precision although there are a small number of solution cases without preparing a comprehensive and expensive thesaurus, etc.

In the first aspect of the present invention, a first case classification apparatus includes a storage unit, an input unit, a feature extraction unit, a correlation assignment unit, a field judge, and an output unit. The storage unit stores a correlation dictionary in which information indicating the level of the correlation between each feature extracted from a set of cases classified into each category of a first category system and each category of the first category system is registered, and a classification rule for classification of a case into a category of a second category system. The input unit inputs an unknown case. The feature extraction unit extracts a feature from an unknown case. The correlation assignment unit refers to a correlation dictionary, obtains the information indicating the level of the correlation between the feature extracted from the unknown case and each category of the first category system, and assigns the obtained information to the feature extracted from the unknown case. The field judge classifies the unknown case into a category of the second category system based on the classification rule using the feature of the unknown case to which the information indicating the correlation level is assigned. The output unit outputs a classification result of the unknown case.

In the second aspect of the present invention, the first case classification apparatus further includes a correlation extraction unit for generating the correlation dictionary. The feature extraction unit extracts a feature from the set of cases classified into each category of the first category system, and the correlation extraction unit calculates the level of the correlation between the feature extracted from the set of cases and each category of the first category system, and generates the correlation dictionary.

In the third aspect of the present invention, the first case classification apparatus further includes a classification rule generator for generating the classification rule. The feature extraction unit extracts a feature from a solution case for a second category system, and the correlation assignment unit refers to the correlation dictionary, obtains the information indicating the level of the correlation between the feature extracted from the solution case and each category of the first category system, and assigns the obtained information to the feature extracted from the solution case. The classification rule generator generates the classification rule using the feature of the solution case to which the information indicating the correlation level.

In the fourth aspect of the present invention, a second case classification apparatus includes a storage unit, an input unit, a feature extraction unit, a judgment result assignment unit, a field judge, and an output unit. The storage unit stores a first classification rule for classification of a case into a category of a first category system and a second classification rule for classification of a case into a category of a second category system. The input unit receives an unknown case. The feature extraction unit extracts a feature from the unknown case. The judgment result assignment unit determines certainty with which the unknown case belongs to each category of the first category system using the feature extracted from the unknown case and the first classification rule, and assigns the information about the certainty to the feature extracted from the unknown case. The field judge classifies the unknown case into categories of the second category system using the feature of the unknown case to which the information about the certainty is assigned. The output unit outputs a classification result of the unknown case.

In the fifth aspect of the present invention, the second case classification apparatus further includes a classification rule generator for generating the second classification rule. The feature extraction unit extracts a feature from a solution case for the second category system, and the judgment result assignment unit determines certainty with which the solution case belongs to each category of the first category system using the feature extracted from the solution case and the first classification rule, and assigns the information about the certainty to the feature extracted from the solution case. The classification rule generator generates the second classification rule using the feature of the solution case to which the information about the certainty is assigned.

BRIEF DESCRIPTION OF THE DRAWINGS

FIG. 2 shows an example of a document;
FIG. 3 shows the first example of a feature vector;
FIG. 4 shows the classification rule generator;
FIG. 6 shows the field judge;
FIG. 7 shows the second example of a feature vector;
FIG. 8 shows an example of a certainty list;
FIG. 12 shows an example of the structure of the feature-category correlation dictionary;
FIG. 13 shows the first example of the feature-category correlation dictionary;
FIG. 17 shows an example of an evaluation value vector;
FIG. 19 is a flowchart of the field judging process;
FIG. 20 shows the second example of the feature-category correlation dictionary;
FIG. 24 shows the configuration of the information processing device.

DESCRIPTION OF THE PREFERRED EMBODIMENT

The embodiments of the present invention are explained below in detail.

In an embodiment of the present invention, when a case is classified into a category system, the classification can be performed with high precision using an occurrence pattern of a feature of a case classified into another category system and the classification rule into a category system although there are a small number of solution cases. Described below is an embodiment of mainly classifying a document.

Figure 10:
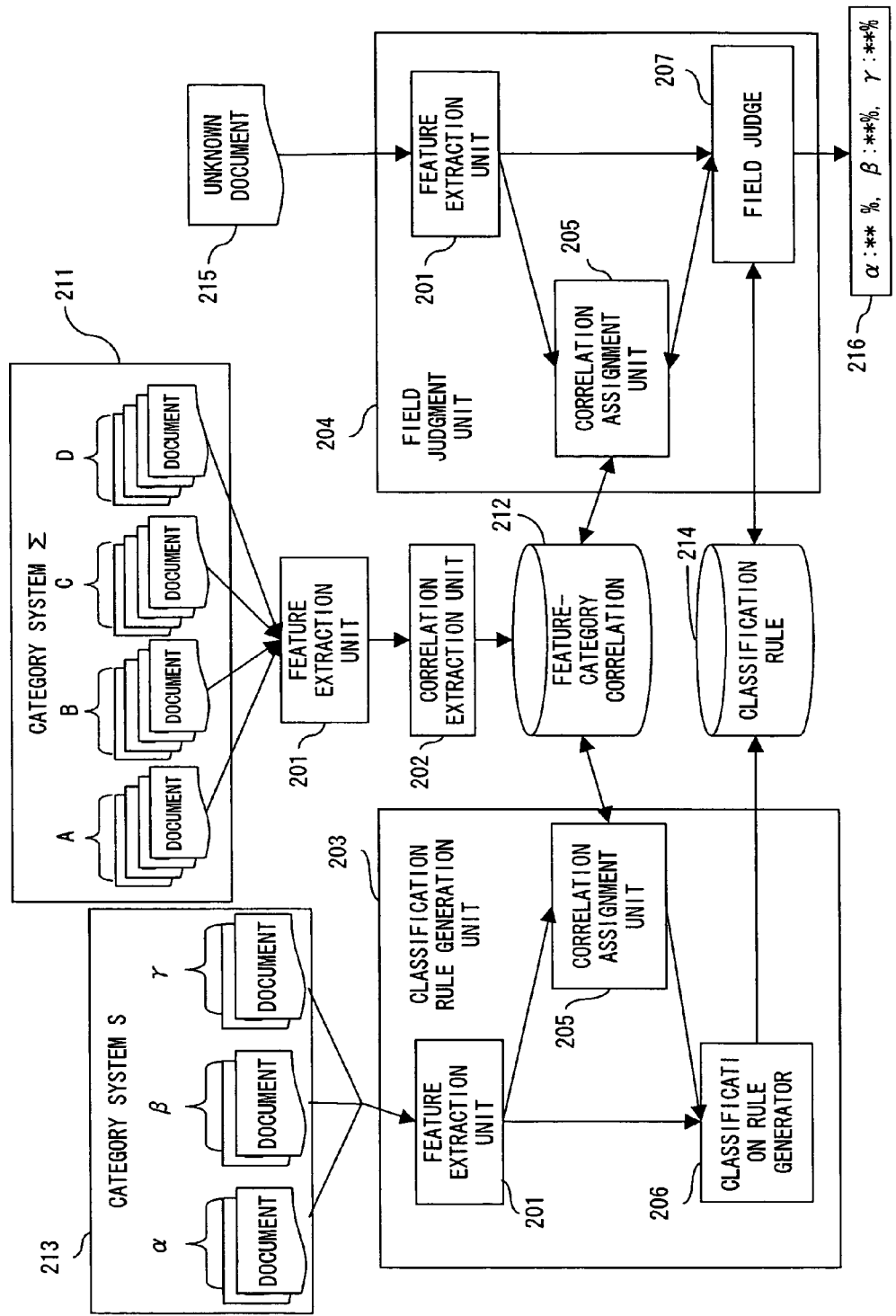
FIG. 10 shows the configuration of the first document classification system of the present invention.

FIG. 10 shows the configuration of the document classification system according to an embodiment of the present invention. The document classification system shown in FIG. 10 comprises a feature extraction unit 201, a correlation extraction unit 202, a classification rule generation unit 203, and a field judgment unit 204. The classification rule generation unit 203 comprises the feature extraction unit 201, a correlation assignment unit 205, and a classification rule generator 206, and the field judgment unit 204 comprises the feature extraction unit 201, the correlation assignment unit 205, and a field judge 207.

The document classification system aims at classifying an unknown document 215 into the categories (α, β, and γ) of the category system S. To achieve this, it uses the information about a document set 211 classified into the categories (A, B, C, and D) of another category system Σ.

First, the feature extraction unit 201 extracts a feature from each document of the document set 211, and the correlation extraction unit 202 calculates the level of the correlation between the feature and each category of the category system Σ, and registers the result in a feature-category correlation dictionary 212.

Then, while referring to the information registered in the feature-category correlation dictionary 212, the classification rule generation unit 203 generates a classification rule 214 from a solution document set 213. At this time, depending on the feature appearing in each solution document, the classification rule 214 is generated after assigning an evaluation value of a correlation level to each solution document.

Then, while referring to the information registered in the feature-category correlation dictionary 212, the field judgment unit 204 classifies the unknown document 215 into categories of the category system S using the classification rule 214, and obtains the certainty 216 with which the unknown document 215 belongs to each respective category. At this time, depending on the feature appearing in the unknown document 215, the evaluation value of the correlation level is assigned as a feature to the unknown document 215, and then the unknown document 215 is classified using the classification rule 214.

Thus, using the feature-category correlation dictionary 212, the solution document set 213, the feature f which appears in the unknown document 215, but does not appear in the solution document set 213 can be indirectly used as a feature in classification so far as the feature has correlation to any category of the category system Σ. If the feature f appears in the document set 211, the feature f has a correlation to a category of the category system Σ in most cases, and the feature can be used in classification.

Figure 9:
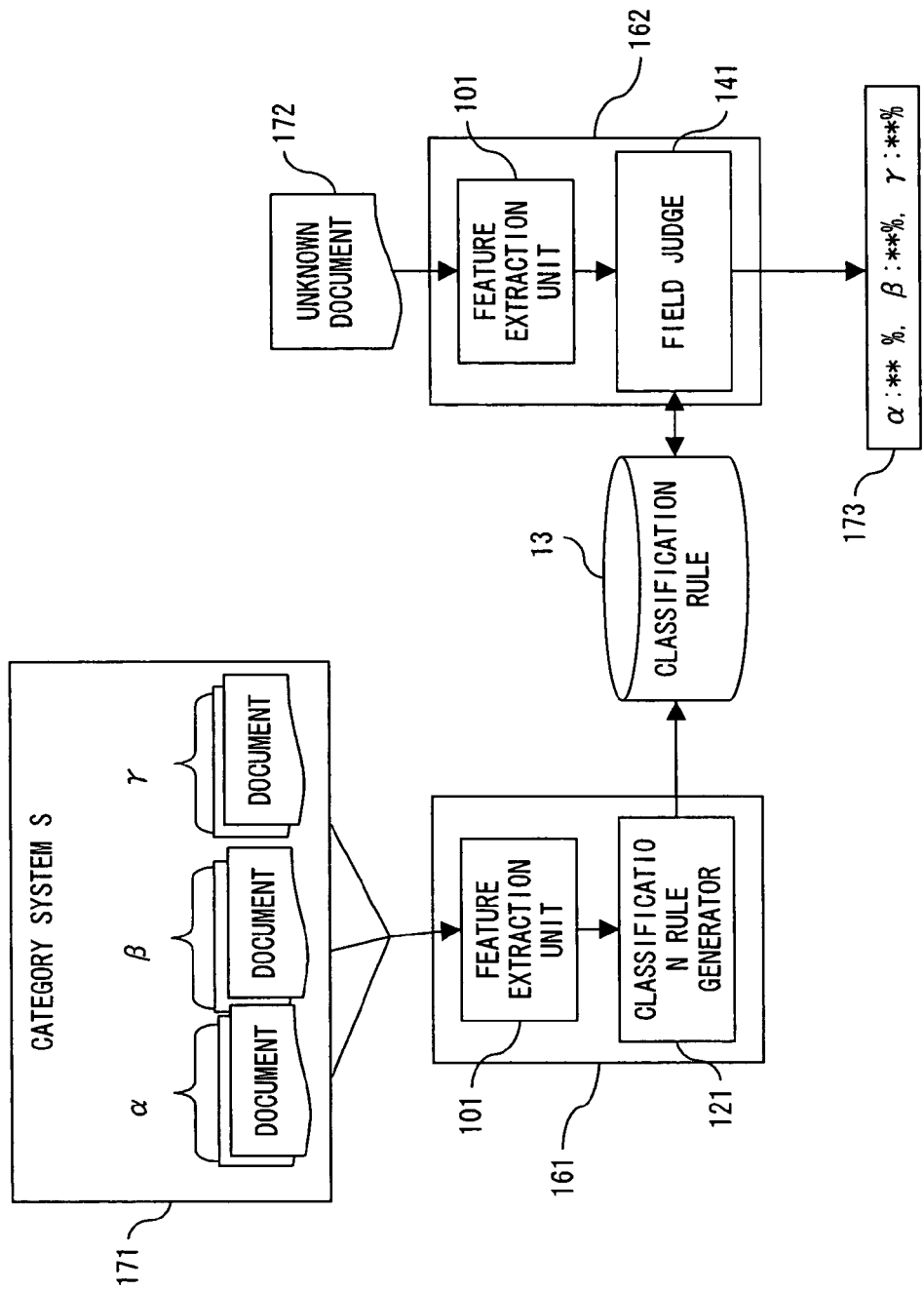
FIG. 9 shows a conventional classifying method.

In the conventional classifying method shown in FIG. 9, only the data classified into the same category system S is used when an unknown document is classified into a category of the category system S. Therefore, when an unknown document is classified using a classification rule, only a feature appearing in the solution document can be used.

For example, assume that a document such as "among the nations . . . the NATO Summit and the attack against Iraq" is to be classified into the category "S: the Defence Agency" in the category system S of authorities concerned. In the conventional classifying method, unless the word "NATO" appears in a solution document of the category the Defence Agency, the feature "NATO" cannot be used as a clue.

Conversely, in the classifying method according to the present embodiment, the information about the document classified into the category system Σ of news can be used in addition to the category system S of the authorities concerned. For example, assuming that a large volume of news is classified into the category of the category system Σ, and the words such as "NATO", "Self-Defence Forces", "Defence", etc. have a good correlation with the categories "Σ: International" and "Σ: Military".

In this case, if the words "Self-Defence Forces" and "Defence" appear in a solution document of the category "S: the Defence Agency", then a classification rule for classifying a document in which a word having a good correlation with "Σ: International" and "Σ: Military" appears, into "S: the Defence Agency" can be generated. The document "among the nations . . . the NATO Summit and the attack against Iraq" includes the word "NATO", and since the word has a good correlation with "Σ: International" and "Σ: Military", the document is classified into "S: the Defence Agency" as desired.

The process performed by the document classification system shown in FIG. 10 is explained in detail by referring to FIGS. 11 through 20. In the following explanation, it is assumed that patent classification is used to generate classification rules from a small number of press release documents. An information communication relevant press release category (category system S) might be:

i) personal computer
ii) server
iii) peripheral equipment
iv) mobile product
v) software
vi) storage
vii) electronic device
viii) network product
iv) solution
x) Nifty (registered trademark)

The category (category system Σ) of patent classifications might be, for example, the following IPC (International Patents Classification) codes.

A necessities of life
B processing operations; transportation
C chemistry; metallurgy
D fiber; paper
E fixed structure
F mechanical engineering; illumination; heating; arms; explosives
G physics
H electricity (H01, H02, H03, . . . )

Figure 11:
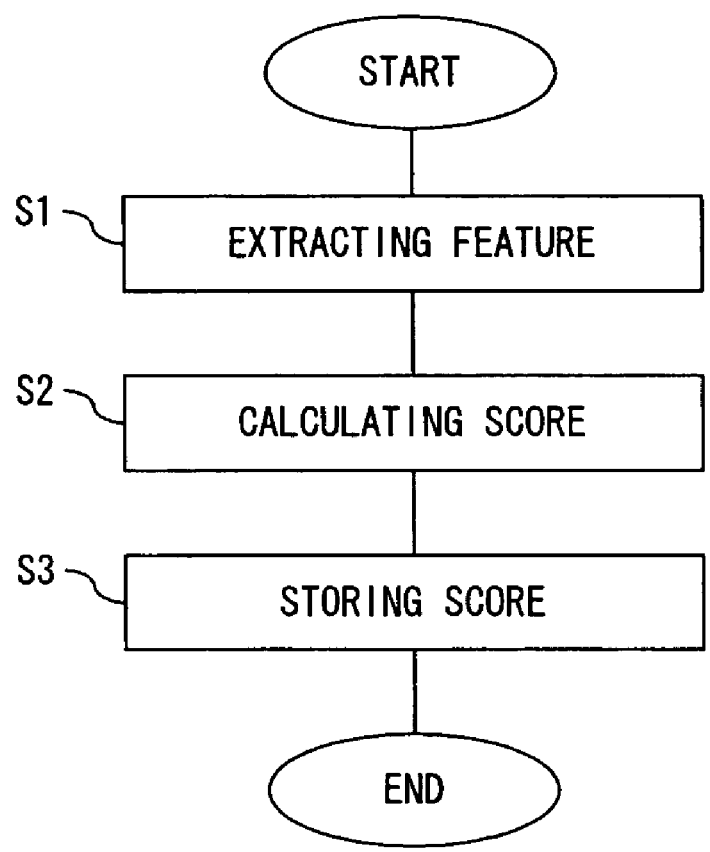
FIG. 11 is a flowchart of the feature-category correlation dictionary generating process.

FIG. 11 is a flowchart of the feature-category correlation dictionary generating process. In this process, the correlation between the feature of a document and the category is quantified using the predetermined document set 211. At this time, the correlation extraction unit 202 generates the feature-category correlation dictionary 212 using a pair of feature vectors generated from a classified document and a category.

Figure 1:
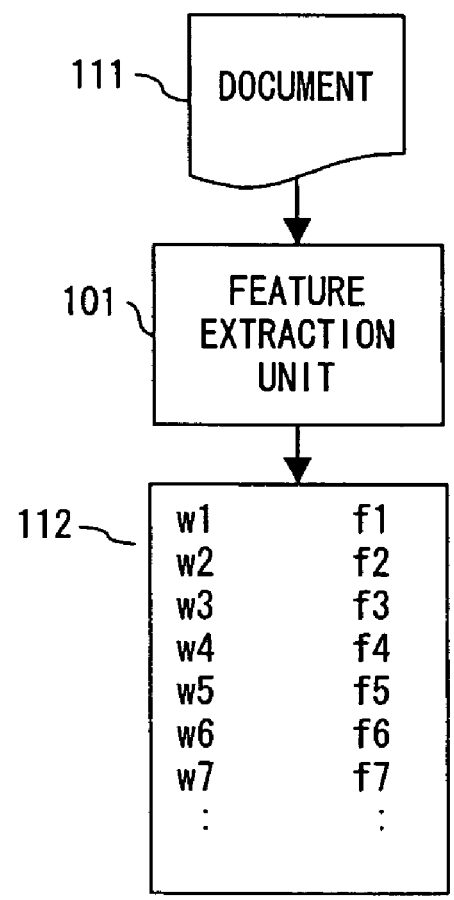
FIG. 1 shows the feature extraction unit.
Figure 5:
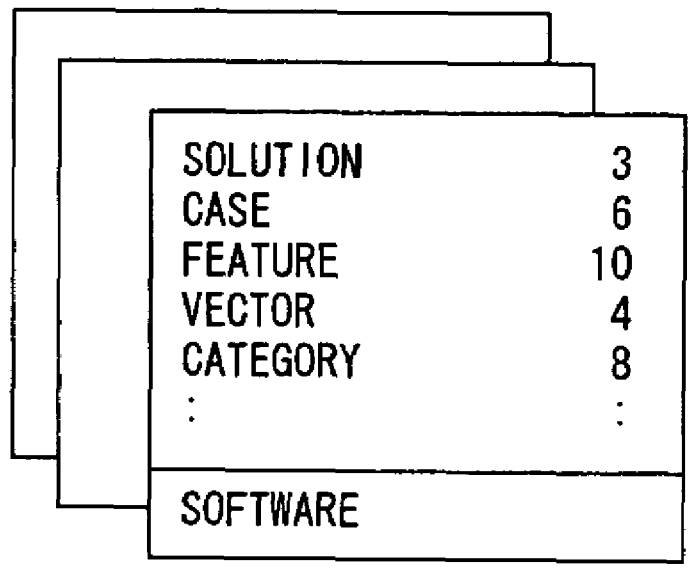
FIG. 5 shows an example of a pair of a feature vector and a category.

First, the feature extraction unit 201 extracts a feature from each document in a process as shown in FIG. 1, and converts the document into feature vector format (step S1). For example, when a word is extracted as a feature, a well known technology of morpheme analysis, etc. is used to generate a word vector as a feature vector. Furthermore, the name of an author, a generation date, the information about a linked document, and other information can be extracted as a feature.

Then, the correlation extraction unit 202 calculates a score indicating the degree (level) of the correlation between each extracted feature and each category of a category system Σ (step S2). As a score, the indices such as a correlation coefficient, a mutual information amount reference, an information amount gain reference, a $\chi$ square assay reference, etc. are used. For example, when a correlation coefficient is used, the correlation rcw between a category c and a feature w is calculated by the following equation.

$$r_{cw} = \frac{\sum_{i=1}^{n}(x_{wi} - \bar{x}_w)(y_{ci} - \bar{y}_c)}{\sqrt{\sum_{i=1}^{n}(x_{wi} - \bar{x}_w)^2 \sum_{i=1}^{n}(y_{ci} - \bar{y}_c)^2}} \quad (1)$$

where n indicates the total number of documents, $x_{wi}$ is a variable which is 1 when a feature w appears in the i-th document, and 0 when it does not appear there, and $x_w$ indicates an average number of occurrences of a feature w. Furthermore, $y_{ci}$ is a variable which is 1 when a category c is assigned to the i-th document, and 0 when it is not assigned, and $y_c$ indicates an average assignment rate of the category c.

The correlation extraction unit 202 stores each of the obtained scores in the feature-category correlation dictionary 212 (step S3).

FIG. 12 shows an example of the thus generated feature-category correlation dictionary. In this example, the score indicating the degree of the correlation between the i-th feature wi (i=1, 2, 3, . . . ) and the j-th category cj (j=1, 2, 3, . . . ) is represented as the score i, j, etc.

When a category of the above-mentioned patent classification is used, the feature-category correlation dictionary 212 is as shown in FIG. 13. In the feature-category correlation dictionary shown in FIG. 13, for example, the level of the correlation between the word "fertilizer" and the category "A necessities of life" is 0.7.

Figure 14:
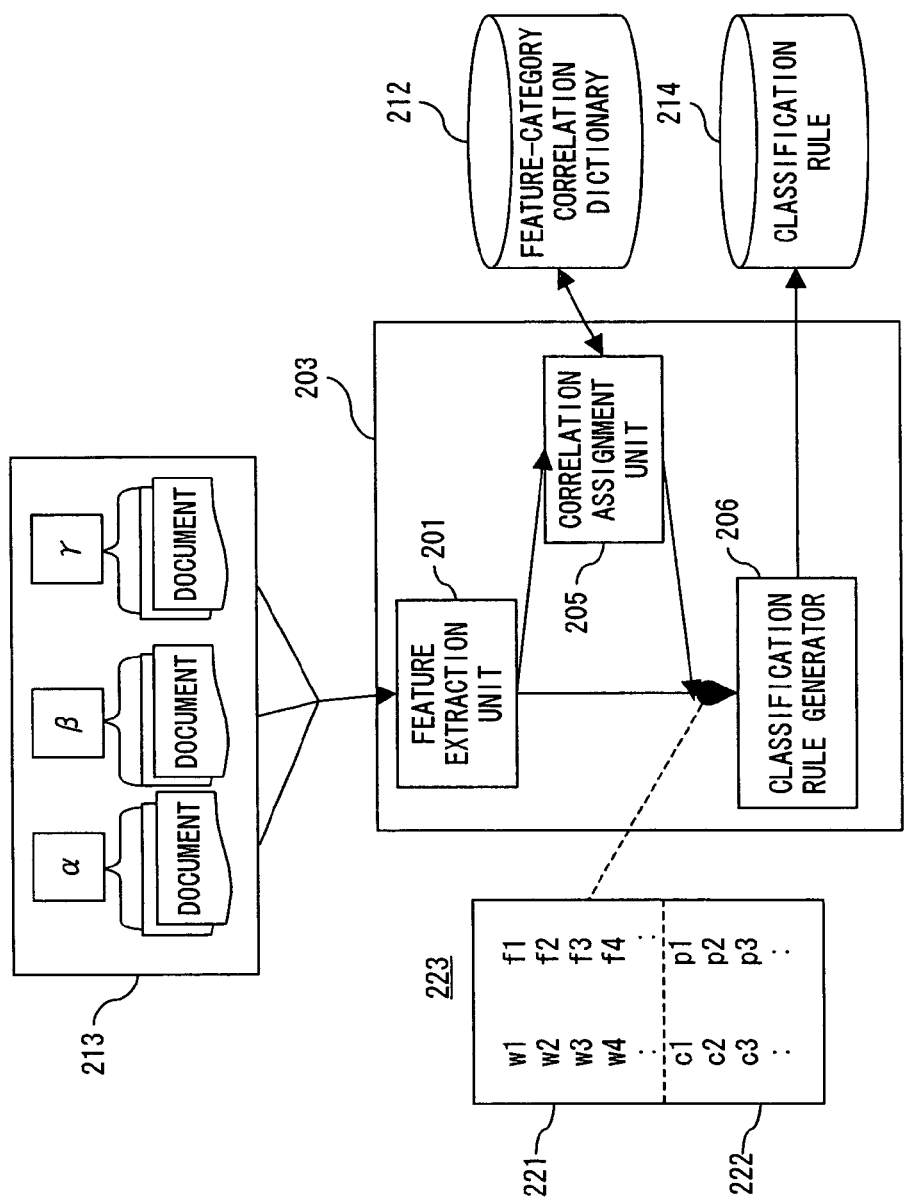
FIG. 14 shows the process of the first classification rule generator.

FIG. 14 shows the process of the classification rule generation unit 203. In this process, the learning is performed using the predetermined solution document set 213 as a teaching case, thereby generating the classification rule 214.

First, the feature extraction unit 201 of the classification rule generation unit 203 generates a feature vector 221 from the solution document set 213, and passes it to the correlation assignment unit 205. Then, the correlation assignment unit 205 refers to the feature-category correlation dictionary 212 and generates a new feature vector 222 for a target document.

Then, a feature vector 223 obtained by integrating the original feature vector 221 with the feature vector 222 generated by the correlation assignment unit 205 is passed to the classification rule generator 206. Then, the classification rule generator 206 receives a pair of the feature vectors 223 and categories, and generates the classification rule 214 in the process as shown in FIG. 4.

Figure 15:
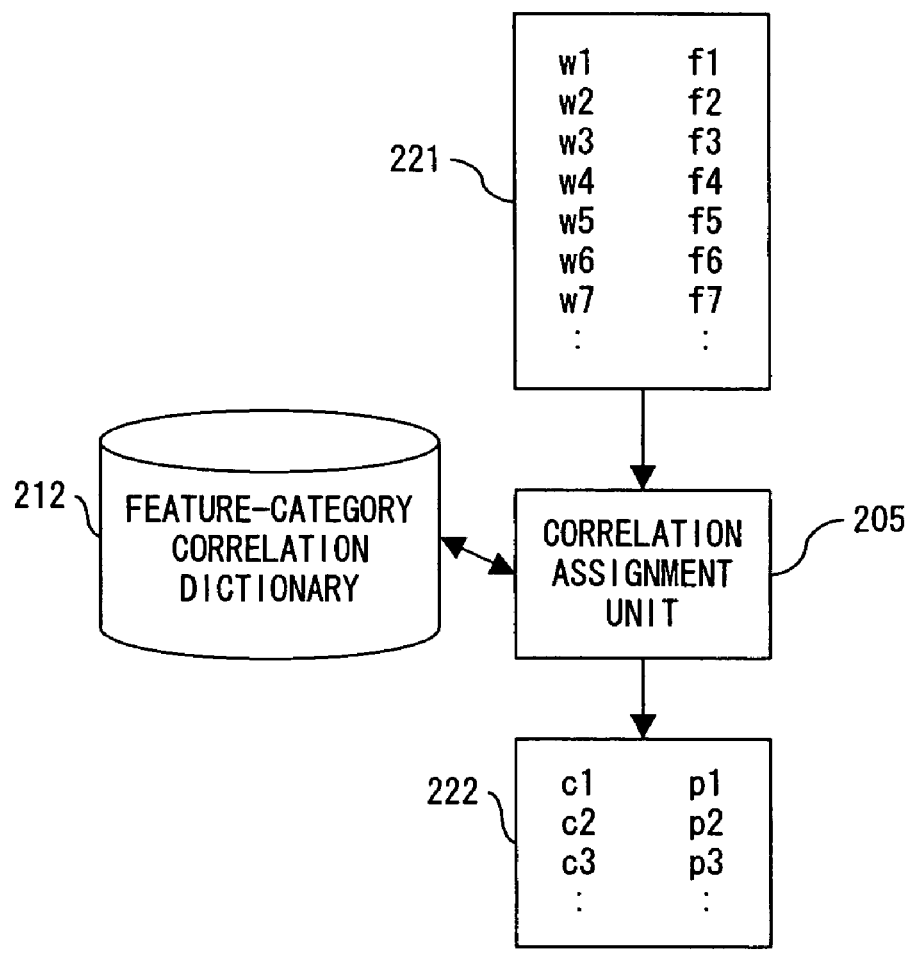
FIG. 15 shows the process of the correlation assignment unit.

FIG. 15 shows the process of the correlation assignment unit 205. The correlation assignment unit 205 receives the feature vector 221, and assigns the information about the feature-category correlation dictionary 212 as the feature vector 222 to the feature vector 221.

Figure 16:
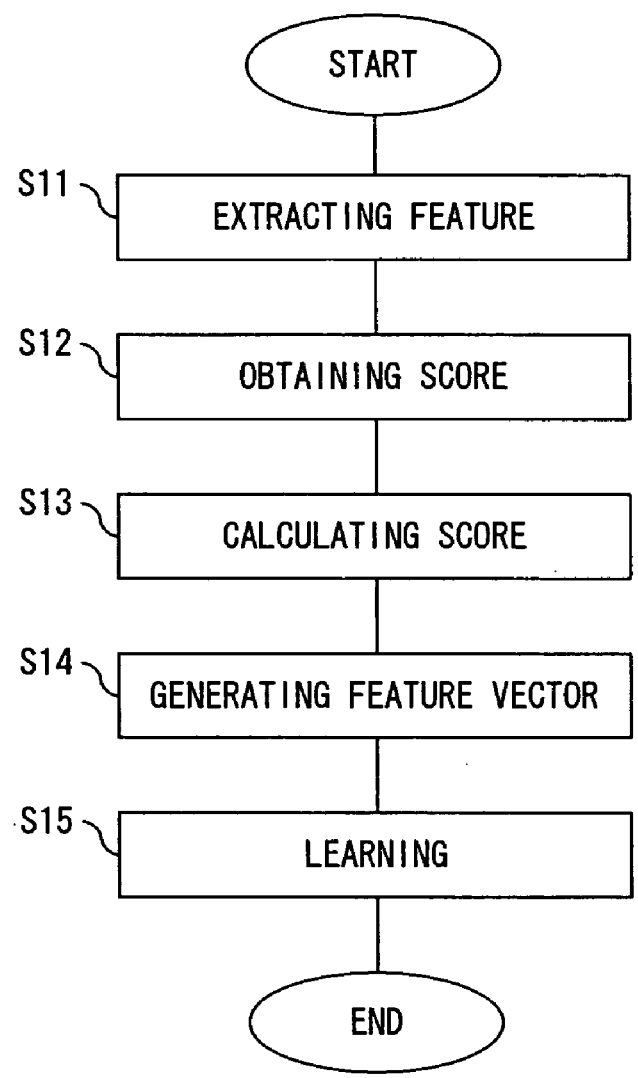
FIG. 16 is a flowchart of the classification rule generating process.

FIG. 16 is a flowchart of the classification rule generating process performed by the classification rule generation unit 203. First, the feature extraction unit 201 extracts a feature from each document of the solution document set 213, and converts the document to the feature vector 221 (step S11).

Then, the correlation assignment unit 205 obtains the score i, j of each category corresponding to the feature wi appearing in a document in the features registered in the feature-category correlation dictionary 212 from the feature-category correlation dictionary 212 (step S12). Then, an evaluation value for each category is calculated using the score i, j (step S13).

The evaluation value pj for the category cj of the feature-category correlation dictionary 212 indicates the certainty with which the document belongs to the category cj of the category system Σ. The value of pj is obtained by the weighted addition as follows using the number of occurrences fi of the feature wi.

$$pj = f1 \times \text{score } 1, j + f2 \times \text{score } 2, j + f3 \times \text{score } 3, j + \ldots \quad (2)$$

where the method of calculating the evaluation value is not limited to the equation (2) above, but other methods can be used with the score i, j.

The correlation assignment unit 205 generates the feature vector 222 (evaluation value vector) using the evaluation value for each category as an element, and generates a new feature vector 223 (step S14). For example, when the word vector as shown in FIG. 7 is extracted as the original feature vector 221, the evaluation value vector as shown in FIG. 17 is generated as the feature vector 222.

Then, the classification rule generator 206 learns using the feature vector 223, and generates the classification rule 214 (step S15).

Practically, there are various category judging methods used for a classification rule, and there are also various methods of learning a classification rule. Therefore, a category judging method and a learning method can be arbitrarily adopted. The following value is used in the classification rule for judging whether or not a document belongs to a category α using the linear judgment as a category judging method.

$$p = a_1 x_1 + a_2 x_2 + \ldots + a_n x_n + a_0 \quad (3)$$

where $a_i$ is a coefficient of the i-th feature, and $x_i$ is a variable which is 1 when the i-th feature is in a document, and 0 when it is not in the document.

If the value p of (3) is equal to or higher than a predetermined threshold (normally 0, etc.), then the document is judged as belonging to the category α. If the value p is smaller than the threshold, the document is judged as not belonging to the category a.

When the classification rule for judging whether or not a document belongs to a category is generated by the linear judgment rule generating method based on a barycenter, the respective documents are represented by the feature vector $x_1, \ldots, x_n$ in step S11, and the feature vector 223 is represented by $x_1, \ldots, x_n, x_{c1}, \ldots, x_{cm}$ in step S14. $x_{c1}, \ldots, x_{cm}$ are evaluation values calculated in step S13.

In step S15, the classification rule generator 206 obtains the barycenter $c_{posi}$ of a document group belonging to a category and the barycenter $c_{nega}$ of a document group not belonging to the category in the documents of the document set 213, and obtains the vertical bisector plane to the barycenter $c_{posi}$ and $c_{nega}$. These barycenters are represented as the points in the feature vector space. The vertically bisector plane is represented by the following equation (4).

$$2 \sum_{i=1\ldots n, cl \ldots cm} (x_{posi,i} - x_{nega,i}) x_i - \sum_{i=1\ldots n, cl \ldots cm} (x_{posi,i}^2 - x_{nega,i}^2) = 0 \quad (4)$$

where the barycenters $c_{posi}$ and $c_{nega}$ are the i-th coordinates of the $c_{posi}$ and $c_{nega}$ respectively. The left side of equation (4) is the same as the right side of equation (3). Therefore, when the feature vector of a document to be classified is xi, and the value p is calculated using the right side of the equation (4), it can be judged whether or not the document belongs to a certain category.

Figure 18:
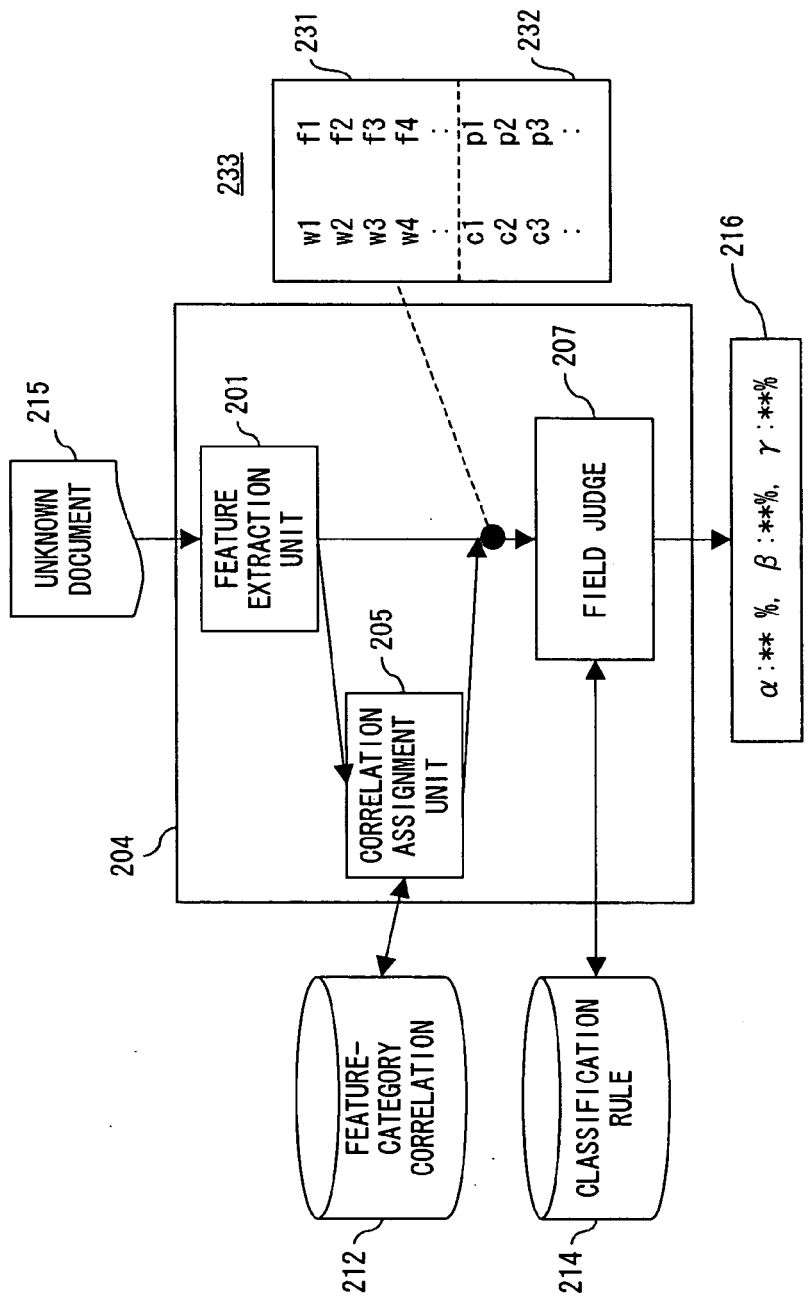
FIG. 18 shows the process of the first field judgment unit.

FIG. 18 shows the process of the field judgment unit 204. First, the feature extraction unit 201 generates a feature vector 231 from the unknown document 215 and passes it to the correlation assignment unit 205. Then, the correlation assignment unit 205 refers to the feature-category correlation dictionary 212 and generates a new feature vector 232 for the unknown document 215.

Then, the feature vector 233 obtained by integrating the original feature vector 231 and the feature vector 232 generated by the correlation assignment unit 205 is passed to the field judge 207. The field judge 207 receives the feature vector 233, performs classification by the classification rule 214, and outputs the certainty 216 for the category.

FIG. 19 is a flowchart of the field judging process performed by the 204. First, the feature extraction unit 201 extracts a feature from the unknown document 215 and converts the unknown document 215 to the feature vector 231 (step S21).

The correlation assignment unit 205 obtains from the feature-category correlation dictionary 212 the score i, j for each category corresponding to the feature wi appearing in the unknown document 215 in the features registered in the feature-category correlation dictionary 212 (step S22). Using the score i, j, the evaluation value for each category is calculated (step S23).

The correlation assignment unit 205 generates the feature vector 232 (evaluation value vector), integrates it with the original feature vector 231, and generates a new feature vector 233 (step S24).

The field judge 207 judges the field using the feature vector 233, and obtains the certainty 216 for the category (step S25).

For example, when it is judged whether or not the unknown document 215 belongs to the category a using the classification rule based on the above-mentioned linear judgment, the unknown document 215 is represented by the feature vector $x_1, \ldots, x_n$ in step S21, and the feature vector 233 is represented by $x_1, \ldots, x_n, x_{c1}, \ldots, x_{cm}$ in step S24.

In step S25, the field judge 207 calculates the value p by the equation (3), judges that the unknown document 215 belongs to the category α if p is equal to or larger than the threshold, and judges that the unknown document 215 does not belong to the category α if p is smaller than the threshold. In this case, the certainty with which the unknown document 215 belongs to the category α is calculated based on, for example, the value of p.

A practical example of a process performed by the document classification system shown in FIG. 10 is explained below by comparing it with a conventional classification method.

To automatically classify an unknown document into a press release category "electronic device" belonging to "vii)

electronic device" (category system S) or into a press release category "Not electronic device" not belonging thereto, assume that the information about a document (patent category "semiconductor device") belonging to the "H01L semiconductor device" (category system Σ) of the category "H electricity" of the patent classification and a document (patent category "not semiconductor device") not belonging thereto.

For example, assume that a document entitled "We have released dual operation flash memory." has been released by an information communication enterprise. It is desired that it can be automatically classified as a member of the press release category "electronic device".

In the conventional classification method, so far as the "dual operation flash memory" is not contained in a teaching case, classification into the category "electronic device" cannot be successfully performed because it is considered that the text contains only the "dual operation flash memory" as a word which can be a feature of the press release category "electronic device". When the above-mentioned linear judgment is used, the conventional classification rule generating process is described below.

1. As a teaching case (previous press release), a document belonging to the category "electronic device" and a document not belonging thereto are prepared.
2. A word is extracted from a teaching case, and using it as a feature the documents are represented by an n-dimensional feature vector of $x_1, \ldots, x_n$.
3. Learning is performed using the feature vector obtained by 2 above, and the barycenter $c_{posi}$ of the document group belonging to the press release category "electronic device" and the barycenter $c_{nega}$ of the document group belonging to the press release category "not electronic device" are obtained.
4. The vertical bisector plane to the barycenter $c_{posi}$ and $c_{nega}$ is obtained.
5. The equation of the obtained vertical bisector plane is used as an equation of the linear judgment of a classification rule.

In this case, the conventional field judging process is described as follows.

1. A word is extracted from the unknown document "We have released dual operation flash memory." and the document is represented by the feature vector $x_1, \ldots, x_n$.
2. The value p is obtained from the equation (3).
3. It is judged whether or not p is equal to or larger than a predetermined threshold. Since there are no words available as a feature in the text, it is judged that it does not belong to the press release category "electronic device".

According to the document classification system shown in FIG. 10, the unknown document can be classified into the press release category "electronic device" as follows. First, the feature-category correlation dictionary generating process is performed as follows.

1. Patent documents which belong to the patent category "semiconductor device" and those which do not belong thereto are prepared.
2. The feature extraction unit 201 extracts a word as features of each document.
3. The correlation extraction unit 202 calculates the level of the correlation with the patent category "semiconductor device" for all extracted words based on the correlation coefficient, etc., and generates the feature-category correlation dictionary 212. When a correlation coefficient is used, for example, the feature-category correlation dictionary as shown in FIG. 20 is obtained.
4. The correlation extraction unit 202 stores the generated feature-category correlation dictionary 212.

Then, the classification rule generating process is performed as follows.

1. In the teaching cases (previous press release of enterprise), a document belonging to the press release category "electronic device" and a document not belonging thereto are prepared.
2. The feature extraction unit 201 of the classification rule generation unit 203 is extracted from a teaching case, and using it as a feature the respective documents are represented by the feature vector $x_1, \ldots, x_n$.
3. The correlation assignment unit 205 obtains the score indicating the level of the correlation between each word and each patent category by referring to the feature-category correlation dictionary 212 for each word appearing in a document for each document.

For example, assume that there is a document "Release of new microcomputer with built-in 16-bit CAN loaded with memory" known in the previous press release as belonging to the press release category "electronic device". In this document, the words "memory" and "microcomputer" correspond to the words in the feature-category correlation dictionary shown in FIG. 20, and the scores (correlation coefficients) indicating the levels of the correlation between the words and the patent category "semiconductor device" are 0.5 and 0.4 respectively.

4. The correlation assignment unit 205 performs the weighted addition on the score obtained by 3 above for each document, and obtains an evaluation value for each category. In the case of the above-mentioned document, the evaluation value for the category "semiconductor device" is calculated as follows.

"semiconductor device": $1 \times 0.5 + 1 \times 0.4 = 0.9$ where the calculated evaluation value is referred to as a membership score (a belonging level score) for the patent category "semiconductor device".

5. The correlation assignment unit 205 adds the membership score obtained in 4 above to the feature vector and generates a new feature vector. The feature vector is represented by, for example, $x_1, \ldots, x_n, x_{c1}, \ldots, x_{cm}$. In this example, it is assumed that $x_{c1}$ indicates the membership score for the patent category "semiconductor device".
6. The classification rule generator 206 performs learning using the feature vector generated by the correlation assignment unit 205, and obtains the barycenter $c_{posi}$ of the document group belonging to the press release category "electronic device" and the barycenter $c_{nega}$ of the document group belonging to the press release category "not electronic device".

At this time, if most of the words appearing in the press release category "electronic device" appear in the patent category "semiconductor device" and most of the words appearing in the press release category "not electronic device" do not appear in the patent category "semiconductor device", then the classification rule generator 206 generates a classification rule for classifying a document having a high membership score for the "semiconductor device" into a press release category "electronic device" for the following reasons.

The membership score for the patent category "semiconductor device" of the majority of the documents belonging to the press release category "electronic device" is high. That is, the value of xc1 of most of the documents is, for example, a large value close to 1. In the case of the document "New release of microcomputer with built-in 16-bit CAN loaded with memory", the membership score is 0.9.

Conversely, the membership score for the patent category "semiconductor device" of most of the contents belonging to the press release category "not electronic device" is low. That is, the value of $x_{c1}$ of most of the documents is, for example, a small value close to −1. For example, in the document "Patent relating to cold transportation for fish" belonging to "not electronic device", −0.7 (refrigerator) and −0.3 (transportation) are obtained as the correlation coefficients of the feature-category correlation dictionary shown in FIG. 20, and the membership score for the "semiconductor device" is obtained by the following equation.

"semiconductor device": 1×(−0.7)+1×(−0.3)=−1.0

Thus, in the coordinates of the barycenters $c_{posi}$ of the document group belonging to the press release category "electronic device", the value of the membership score $x_{c1}$ for the patent category "semiconductor device" is high.

On the other hand, in the coordinates of the barycenters $c_{nega}$ of the document group belonging to the press release category "not electronic device", the value of the membership score $x_{c1}$ for the patent category "semiconductor device" is low.

7. The classification rule generator 206 obtains the vertical bisector plane to the barycenters $c_{posi}$ and $c_{nega}$. At this time, since the value of $x_{c1}$ is large for the document group belonging to the press release category "electronic device" as described above, and small for the document group belonging to the press release category "not electronic device", the vertical bisector plane divides a feature vector space so that a document having a large membership score for the patent category "semiconductor device" can be classified into a press release category "electronic device".

The field judging process is performed as follows.

1. The feature extraction unit 201 in the field judgment unit 204 extracts a word from the unknown document "We have released dual operation flash memory." and represents the document by the feature vector $x_1, \ldots, x_n$.
2. The correlation assignment unit 205 references the feature-category correlation dictionary 212 using the extracted word as a key. When the feature-category correlation dictionary shown in FIG. 20 is used, "dual operation flash memory" appears in the unknown document. Therefore, the membership score for the patent category "semiconductor device" of the unknown document can be calculated by the following equation.

"semiconductor device"=1×0.93=0.93

4. The correlation assignment unit 205 adds the membership score obtained in 3 above to the feature vector, and generates a new feature vector. The feature vector is, for example, $x_1, \ldots, x_n, x_{c1}, \ldots, x_{cm}$.
5. The field judge 207 obtains the value p by the equation (3).
6. It is judged whether or not p is equal to or larger than a predetermined threshold. Since $x_{c1}$ indicating the membership score for the patent category "semiconductor device" is a large value such as 0.93 in the elements of the feature vector obtained in 4 above, p is equal to or larger than the threshold. Thus, the unknown document is automatically classified into a press release category "electronic device".

Thus, according to the document classification system shown in FIG. 10, a word not contained in a teaching case can be used as a feature of an unknown document using the feature-category correlation dictionary generated from a categorized document set other than a teaching case and a classification rule generated by referring to the dictionary, thereby successfully classifying a unknown document into the correct categories.

Described below is another practical example of the process performed by the document classification system shown in FIG. 10.

Assume that a document to be classified is an in-house technical document, and there are five categories (category system S), that is, "software", "device", "information processing", "communication", and "financing". To classify a large number of technical documents into these five categories, a small number of documents classified into the categories are prepared as teaching cases. Furthermore, assume that there are a large number of patent documents classified into the above-mentioned patent classification categories as a document set categorized by another category system Σ. First, the feature-category correlation dictionary generating process is performed as follows.

1. The feature extraction unit 201 extracts a word as a feature of each patent document. For example, in the case of the document shown in FIG. 2, the feature vector as shown in FIG. 3 is generated.
2. The correlation extraction unit 202 calculates the level of the correlation with each patent category for all of the extracted words based on the correlation coefficient, etc., and generates the feature-category correlation dictionary 212. Thus, for example, the feature-category correlation dictionary as shown in FIG. 13 can be obtained.
3. The correlation extraction unit 202 stores the generated feature-category correlation dictionary 212.

Then, the classification rule generating process is performed as follows.

1. The feature extraction unit 201 of the classification rule generation unit 203 extracts a word from a teaching case, and using it as a feature, each document is represented by a feature vector. Then, a set of pairs of a feature vector of a document and a category is output. For example, a document such as "We have newly released personal computer listing generating software. We . . . " is converted into a pair of a feature vector such as ("personal computer": 2, "listing":5, "software":3) and a category such as "software".
2. The correlation assignment unit 205 obtains for each document the score indicating the level of the correlation between each word and each patent category by referring to the feature-category correlation dictionary 212 appearing in a document. By performing weighted addition of a score, an evaluation value is obtained for each category. Thus, for example, an evaluation value for each category as shown in FIG. 17 is obtained.
3. The correlation assignment unit 205 adds the evaluation value obtained in 2 above, and generates a new evaluation value vector. Thus, for example, a feature vector such as ("personal computer": 2, "listing": 5, "software": 3, . . . , "necessities of life": 1.1, "process operation; transportation":2.7, . . . ), etc. is generated.
4. The classification rule generator 206 performs learning using a set of pairs of a feature vector generated by the correlation assignment unit 205 and a category output by the feature extraction unit 201, and generates the classification rule 214. For example, if a feature vector space is divided by obtaining a barycenter for each document group belonging to each category, and sequentially calculating a vertical bisector plane to two adjacent barycenters, then a classification rule can be generated.

Then, the field judging process is performed as follows.

1. The feature extraction unit 201 extracts a word from the unknown document 215, and represents the document by a feature vector. For example, when a unknown document "We have released an easily operated scanner. The system is the conventional optical . . . " is input, a feature vector such as ("operation": 3, "optics": 2, "scanner": 8, . . . ), etc. is generated.

2. The correlation assignment unit 205 references the feature-category correlation dictionary 212 using an extracted word as a key, and obtains an evaluation value of each category. When the feature-category correlation dictionary shown in FIG. 13 is used, an evaluation value for each category such as ("necessities of life": 0.8, "process operation"; transportation: 0.3, . . . ), etc. is obtained.

3. The correlation assignment unit 205 adds the evaluation value obtained in 2 above to a feature vector, and generates a new feature vector. Thus, for example, a feature vector such as ("operation": 3, "optics": 2, "scanner": 8, . . . , "necessities of life": 0.8, "process operation; transportation": 0.3, . . . ) is generated.

4. The field judge 207 performs judgment of a field using the classification rule 214 based on the feature vector generated by the correlation assignment unit 205.

When a unknown document "We have released an easily operated scanner. The system is a conventional optical . . . " is classified, and if the word "optical" does not appear in a small number of solution documents in which the word "optical" is a teaching case, then the word is not reflected in the classification rule in conventional technology, thereby offering no trigger for classification.

The unknown document is to be classified into a technological category "software", the following processes can be performed.

First, based on a large number of patent documents, the correlation extraction unit 202 calculates the score indicating a high level of the correlation between the word such as "personal computer", "software", "optics", etc and the patent category "electricity", and outputs it to the feature-category correlation dictionary 212.

Then, when a word such as "personal computer", "software", "optics", etc. appears in a small number of solution documents, the correlation assignment unit 205 of the classification rule generation unit 203 generates a feature vector such that the membership score for the patent category "electricity" can be large using the feature-category correlation dictionary 212. Then, the classification rule generator 206 receives the feature vector, and generates the classification rule 214 for classification of a document having a large value of the membership score for the patent category "electricity" into the technical category "software".

Since the word "optical" appears in the unknown document "We have released an easily operated scanner. The system is the conventional optical . . . ", the correlation assignment unit 205 of the field judgment unit 204 generates a feature vector such that the membership score for the patent category "electricity" can be high according to the information about the feature-category correlation dictionary 212. Then, the field judge 207 classifies the unknown document having the feature vector into the technical category "software" according to the classification rule 214.

In the above-mentioned embodiments, a feature-category correlation dictionary is generated from a document set classified into a category system Σ other than the category system S for use in classification, and uses the dictionary in the classification rule generation and the judgment of a field. However, instead of the feature-category correlation dictionary, the classification rule itself in the category system Σ can be generated, and the classification rule in the category system S is generated using the generated rule, thereby possibly performing the judgment of a field.

Figure 21:
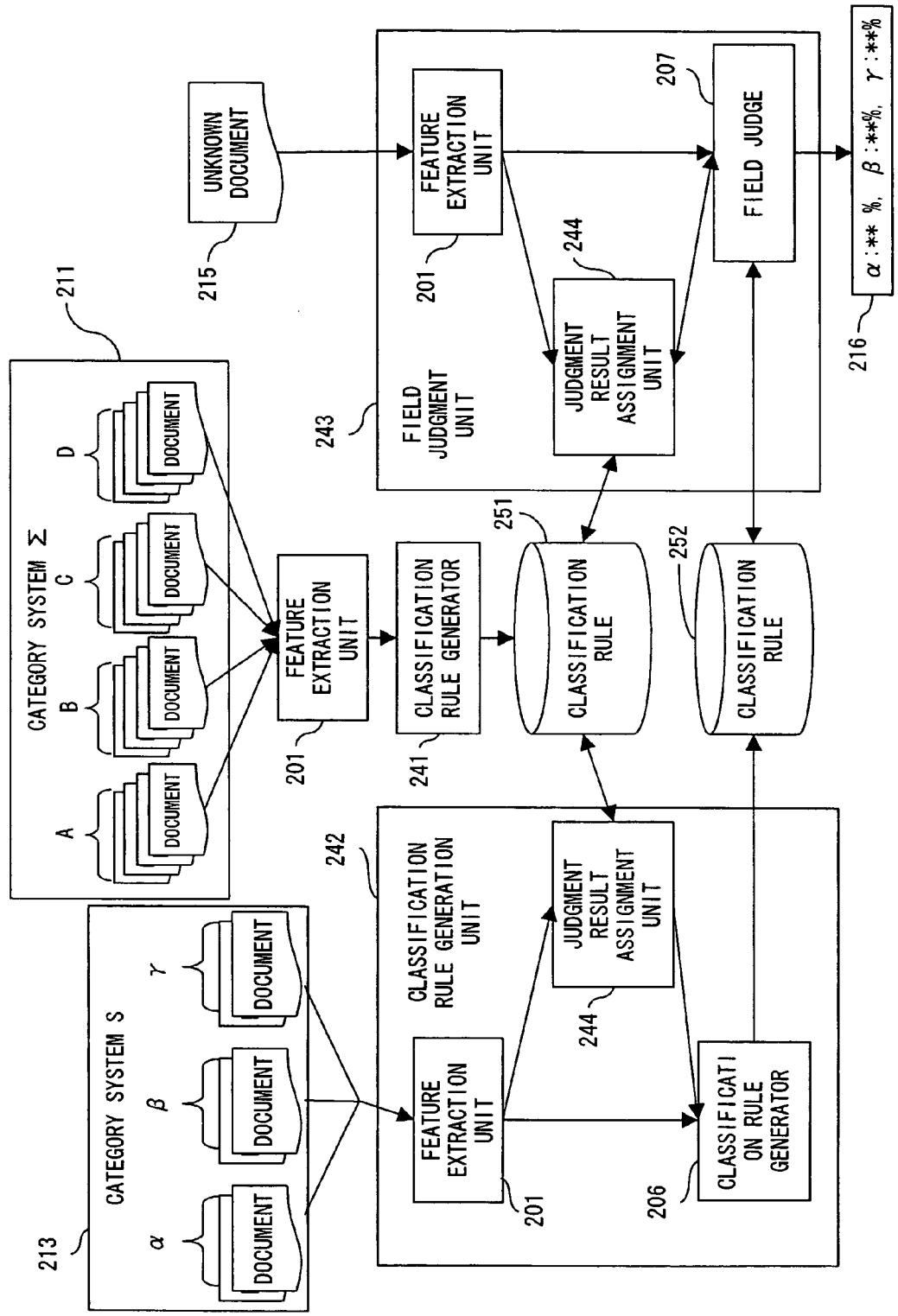
FIG. 21 shows the configuration of the second document classification system of the present invention.

FIG. 21 shows the configuration of the document classification system. The document classification system shown in FIG. 21 comprises the feature extraction unit 201, a classification rule generator 241, a classification rule generation unit 242, and a field judgment unit 243. The classification rule generation unit 242 comprises the feature extraction unit 201, a judgment result assignment unit 244, and a classification rule generator 206. The field judgment unit 243 comprises the feature extraction unit 201, the judgment result assignment unit 244, and the field judge 207.

In the above-mentioned units, the feature extraction unit 201, the classification rule generator 206, and the field judge 207 perform the same processes as the document classification system shown in FIG. 10. Like the classification rule generator 206, the classification rule generator 241 generates a classification rule 251 from a pair of the feature of each document of the document set 211 and a category.

Then, the classification rule generation unit 242 refers to the classification rule 251, and generates a classification rule 252 from the solution document set 213. At this time, using the feature appearing in each solution document, a field judgment result based on the classification rule 251 is assigned to each solution document as a feature, and generates the classification rule 252.

The field judgment unit 243 refers to the classification rule 251, classifies the unknown document 215 into the categories of the category system S based on the classification rule 252, and the unknown document 215 obtains the certainty 216 belonging to each category. At this time, a result of judging a field based on the classification rule 251 using the feature appearing in the unknown document 215 is assigned to the unknown document 215 as a feature, and then the unknown document 215 is classified based on the classification rule 252.

Using the classification rule 251 of another category system Σ like the document classification system shown in FIG. 10, a feature appearing in the unknown document 215 but not appearing in the solution document set 213 can be used in classification.

Figure 22:
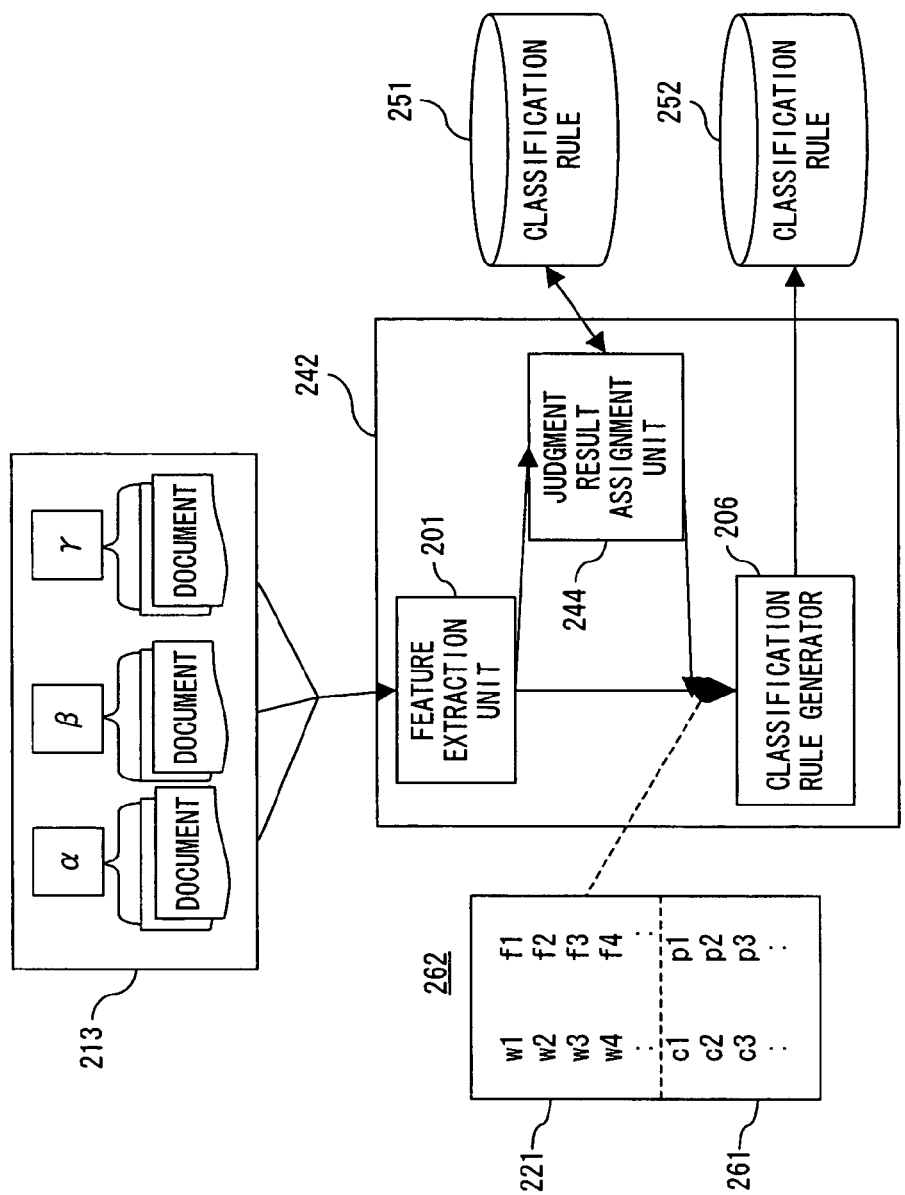
FIG. 22 shows the process of the second classification rule generator.

FIG. 22 shows the process by the classification rule generation unit 242. In this process, learning is performed with the predetermined document set 213 defined as a teaching case, and the classification rule 252 is generated.

First, the feature extraction unit 201 of the classification rule generation unit 242 generates the feature vector 221 from the solution document set 213, and passes it to the judgment result assignment unit 244.

Then, the judgment result assignment unit 244 performs classification using the feature vector 221 based on the classification rule 251, obtains the certainty with which the document belongs to each category of the category system Σ, generates the feature vector 261 using the certainty as an element, integrates the feature vector 221 with a feature vector 261, and generates a new feature vector 262.

Then, the classification rule generator 206 generates the classification rule 252 using as input a pair of a feature vector 262 and a category.

Figure 23:
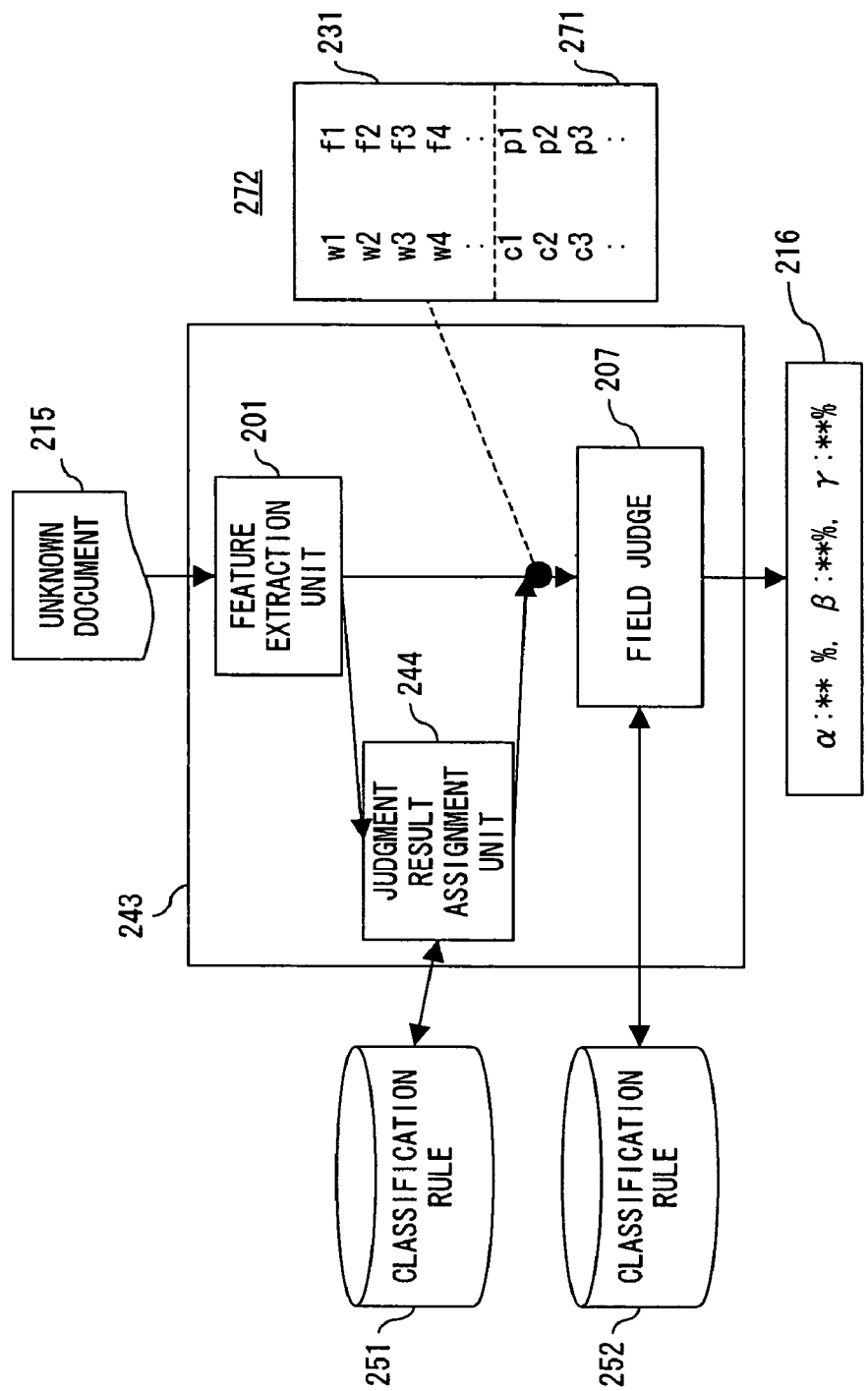
FIG. 23 shows the process of the second field judgment unit.

FIG. 23 shows the process of the field judgment unit 204. First, the feature extraction unit 201 of the field judgment unit 204 generates the feature vector 231 from the unknown document 215, and passes it to the judgment result assignment unit 244.

Then, the judgment result assignment unit 244 performs classification based on the classification rule 251 using the feature vector 231, and obtains the certainty with which the unknown document 215 belongs to each category of the category system Σ. Then it generates a feature vector 271 having the certainty as an element, integrates the feature vector 231 with the feature vector 271, and generates a new feature vector 272.

Then, the field judge 207 uses the feature vector 272 as input, performs classification based on the classification rule 252, and outputs the certainty 216 with which the unknown document 215 belongs to each category of the category system S.

The embodiments of the document classification system are described above, but the present invention is not limited to this applications, and can be applied to many other case classification systems.

For example, in an optical character recognition (OCR), using information as a feature, instead of a word, whether or not the density of a pixel at a predetermined position in an input image, a specific line element, curve, a closed curve, etc. are contained, an input image can be classified into a predetermined character category.

Also in the image recognition, using information as a feature, instead of a word, whether or not the density of a pixel at a predetermined position in an input image, a specific line element, curve, a closed curve, etc. are contained, an input image can be classified into a predetermined character category.

The document classification system shown in FIGS. 10 and 21 can be configured using an information processing device (computer) as shown in FIG. 24. The information processing device shown in FIG. 24 comprises a CPU (central processing unit) 281, memory 282, an input device 283, an output device 284, an external storage device 285, a medium drive device 286, a network connection device 287, and a case input device 288. These components are inter-connected via a bus 289.

The memory 282 includes, for example, ROM (read only memory), RAM (random access memory), etc., and stores a program and data used in processing. The CPU 281 performs necessary processing by performing a program.

The feature extraction unit 201, the correlation extraction unit 202, the classification rule generation units 203 and 242, the field judgment units 204 and 243, the correlation assignment unit 205, the classification rule generators 206 and 241, the field judge 207, and the judgment result assignment unit 244 shown in FIGS. 10 and 21 correspond to the program stored in the memory 282.

The document sets 211 and 213, the unknown document 215, the feature-category correlation dictionary 212, and the classification rules 214, 251, and 252 correspond to the data stored in the memory 282.

The input device 283 can be, for example, a keyboard, a pointing device, a touch panel, etc., and is used in inputting an instruction and information from a user. The output device 284 can be, for example, a display, a printer, a speaker, etc., and is used in outputting an inquiry and process result.

The external storage device 285 can be, for example, a magnetic disk device, an optical disk device, a magneto-optical disk device, a tape device, etc. The information processing device stores the program and data in the external storage device 285, and loads them into the memory 282 as necessary and then used. The external storage device 285 is used as a database storing the document sets 211 and 213 shown in FIGS. 10 and 21.

The medium drive device 286 drives a portable storage medium 290, and accesses the stored contents. The portable storage medium 290 can be a computer-readable storage medium such as a memory card, a flexible disk, a CD-ROM (compact disk read only memory), an optical disk, a magneto-optical disk, etc. The user stores the program and data in the portable storage medium 290, and loads them as necessary into the memory 282 for use.

The network connection device 287 is connected to any communication network such as a LAN (local area network), a LAN (local area network), etc., and performs data conversion for communications. The information processing device receives the program and data as necessary from an external device through the network connection device 287. They can be loaded in the memory 282 and then used.

The case input device 288 is used in inputting case data to be processed such as a document, an image, etc.

Figure 25:
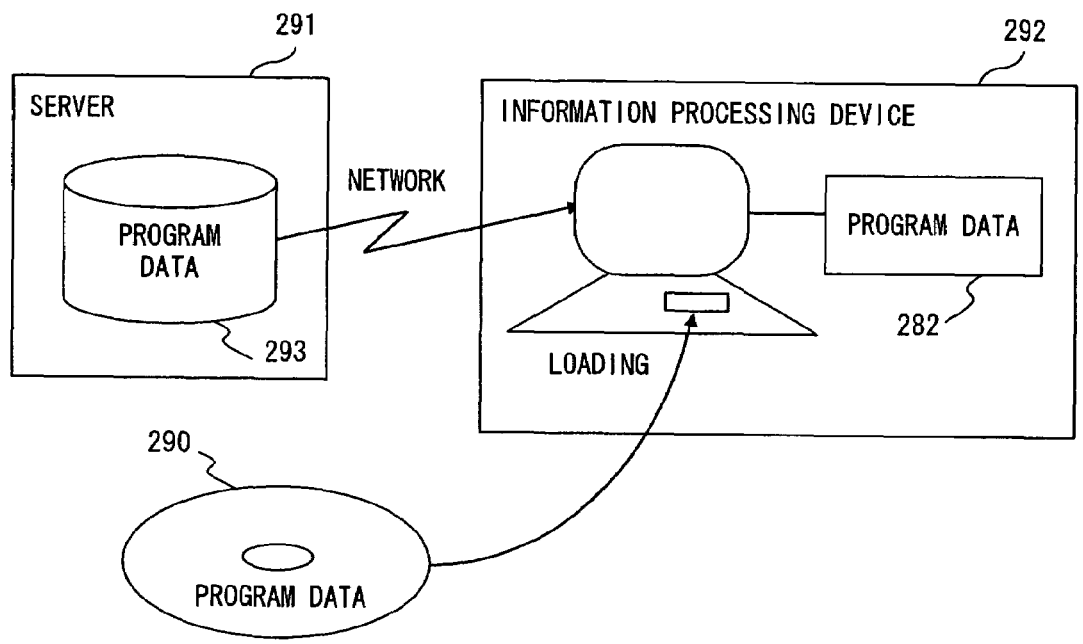
FIG. 25 shows the storage medium.

FIG. 25 shows a computer-readable storage medium capable of providing a program and data for the information processing device shown in FIG. 24. The program and data stored in the portable storage medium 290 and a server 291 are loaded to the memory 282 of an information processing device 292. The server 291 generates a carrier signal for transportation of the program and data, and transmits them to the information processing device 292 through any transmission medium on a network. The CPU 281 performs the program using the data, and performs a necessary process.

According to the present invention, when an unknown case is classified into a category system, an individual or a feature vector appearing in the unknown case is associated with the category of a case classified into another category system, and the associated category can be regarded as a feature of the unknown case. Therefore, as compared with the case in which only a category system to be classified, a case can be classified with high precision.

What is claimed is:

1. A document classification apparatus, comprising:
    a storage unit for storing a correlation dictionary having registered information indicating a level of correlation between each feature extracted from a set of documents classified into each category of a first category system and each category of the first category system including a plurality of categories, and a classification rule for classification of a document into a category of a second category system including a plurality of categories that are different from the plurality of categories of the first category system;
    an input unit for inputting an unknown document;
    a feature extraction unit for extracting a feature from the unknown document;
    a correlation assignment unit for referring to the correlation dictionary, obtaining the information about the level of the correlation between the feature extracted from the unknown document and each category of the first category system, and adding the obtained information to the feature extracted from the unknown document;
    a field judge for classifying the unknown document based on the classification rule into a category of the second category system using a feature of the unknown document to which information about the level of the correlation is added; and an output unit for outputting a classification result of the unknown document.

2. The apparatus according to claim 1, further comprising a correlation extraction unit for generating the correlation dictionary, wherein
the feature extraction unit extracts a feature from the set of documents, and the correlation extraction unit calculates the level of the correlation between the feature extracted from the set of documents and each category of the first category system, and generates the correlation dictionary.

3. The apparatus according to claim 1, further comprising a classification rule generator for generating the classification rule, the feature extraction unit extracts a feature from a solution document for the second category system, the correlation assignment unit refers to the correlation dictionary, obtains information about the level of the correlation between the feature extracted from the solution document and each category of the first category system, and adds the obtained information to the feature extracted from the solution document, and the classification rule generator generates the classification rule using the feature of the solution document to which the information indicating the level of the correlation is added.

4. The document classification apparatus of claim 1, wherein the feature extraction unit generates a feature vector from a solution document set.

5. A document classification apparatus, comprising:
a storage unit for storing a first classification rule for classification of a document into a category of a first category system including a plurality of categories, and a second classification rule for classification of a document into a category of a second category system including a plurality of categories that are different from the plurality of categories of the first category system;
an input unit for inputting an unknown document;
a feature extraction unit for extracting a feature from the unknown document;
a judgment result assignment unit for judging certainty with which the unknown document belongs to each category of the first category system using the feature extracted from the unknown document and the first classification rule, and adds information about the certainty to the feature extracted from the unknown document;
a field judge for classifying the unknown document based on the second classification rule into a category of the second category system using the feature of the unknown document to which the information about the certainty is added; and
an output unit for outputting a classification result of the unknown document.

6. The apparatus according to claim 5, further comprising a classification rule generator for generating the second classification rule, wherein
the feature extraction unit extracts a feature from a solution document for the second category system, the judgment result assignment unit judges certainty with which the solution document belongs to each category of the first category system using the feature extracted from the solution document and the first classification rule, and adds information about the certainty to the feature extracted from the solution document, and the classification rule generator generates the second classification rule using the feature of the solution document to which the information about the certainty is added.

7. A document classification apparatus, comprising:
storage means for storing a correlation dictionary having registered information indicating a level of correlation between each feature extracted from a set of documents classified into each category of a first category system and each category of the first category system including a plurality of categories, and a classification rule for classification of a document into a category of a second category system including a plurality of categories that are different from the plurality of categories of the first category system;
input means for inputting an unknown document;
feature extraction means for extracting a feature from the unknown document;
correlation assignment means for referring to the correlation dictionary, obtaining the information about the level of the correlation between the feature extracted from the unknown document and each category of the first category system, and adding the obtained information to the feature extracted from the unknown document;
field judge means for classifying the unknown document based on the classification rule into a category of the second category system using a feature of the unknown document to which information about the level of the correlation is added; and
output means for outputting a classification result of the unknown document.

8. A document classification apparatus, comprising:
storage means for storing a first classification rule for classification of a document into a category of a first category system including a plurality of categories, and a second classification rule for classification of a document into a category of a second category system including a plurality of categories that are different from the plurality of categories of the first category system;
input means for inputting an unknown document;
feature extraction means for extracting a feature from the unknown document;
judgment result assignment means for judging certainty with which the unknown document belongs to each category of the first category system using the feature extracted from the unknown document and the first classification rule, and adds information about the certainty to the feature extracted from the unknown document;
field judge means for classifying the unknown document based on the second classification rule into a category of the second category system using the feature of the unknown document to which the information about the certainty is added; and
output means for outputting a classification result of the unknown document.

9. A computer-readable storage medium storing a program used to direct a computer to perform the processes of:
extracting a feature from an unknown document;
referring to a correlation dictionary stored in a storage unit and including information about a level of correlation between each feature extracted from the set of documents classified into each category of a first category system and each category of the first category system including a plurality of categories, and obtaining the level of the correlation between the feature extracted from the unknown document and each category of the first category system;
adding the obtained information to the feature extracted from the unknown document;
classifying the unknown document into a category of a second category system including a plurality of categories that are different from the plurality of categories of the first category system using the feature of the unknown document to which the information about the level of the correlation using the feature of the unknown document to which the information indicating the level of the correlation based on the classification rule stored in the storage unit and used for classification of a document into a category of the second category system; and
outputting a classification result of the unknown document.

10. The computer-readable storage medium storing a program according to claim 9, wherein the program is used to direct a computer to perform the further process of:
extracting a feature from the set of documents, calculating a level of correlation between the feature extracted from the set of documents and each category of the first category system, and generating the correlation dictionary.

11. The computer-readable storage medium storing a program according to claim 9, wherein the program is used to direct a computer to perform the further process of:
extracting a feature from a solution document for the second category system, referring to the correlation dictionary, obtaining the information about the level of the correlation between the feature extracted from the solution document and each category of the first category system, adding the obtained information to the feature extracted from the solution document, and generating the classification rule using the feature of the solution document to which the information about the level of the correlation is added.

12. The computer-readable storage medium storing a program according to claim 9, wherein the program is used to direct a computer to perform the further process of:
reading characters of a physical document using optical character recognition (OCR);
generating an electronic document from the read characters; and
classifying the generated document into a category of the second category system.

13. A computer-readable storage medium storing a program used to direct a computer to perform the processes of:
extracting a feature from an unknown document;
judging certainty with which the unknown document belongs to each category of a first category system that includes a plurality of categories using a first classification rule stored in a storage unit and used for classification of a document into a category of the first category system and the feature extracted from the unknown document;
adding information about the certainty to the feature extracted from the unknown document;
classifying the unknown document into a category of a second category system including a plurality of categories that are different from the plurality of categories of the first category system based on a second classification rule stored in the storage unit and used for classification of a document into a category of a second category system using the feature of the unknown document to which the information about the certainty is added; and
outputting a classification result of the unknown document.

14. The computer-readable storage medium storing a program according to claim 13, wherein the program is used to direct a computer to perform the further process of:
extracting a feature from a solution document for the second category system, judging the certainty with which the solution document belongs to each category of the first category system using the feature extracted from the solution document and the first classification rule, adding the information about the certainty to the feature extracted from the solution document, and generating the second classification rule using the feature of the solution document to which the information about the certainty is added.

15. The computer-readable storage medium storing a program according to claim 13, wherein the program is used to direct a computer to perform the further process of:
reading characters of a physical document using optical character recognition (OCR);
generating an electronic document from the read characters; and
classifying the generated document into a category of the second category system.

16. A document classification method, comprising:
extracting a feature from an unknown document;
referring to a correlation dictionary stored in a storage unit and including information about a level of correlation between each feature extracted from the set of documents classified into each category of a first category system and each category of the first category system including a plurality of categories, obtaining the level of the correlation between the feature extracted from the unknown document and each category of the first category system, and adding the obtained information to the feature extracted from the unknown document;
classifying the unknown document into a category of a second category system including a plurality of categories that are different from the plurality of categories of the first category system using the feature of the unknown document to which the information about the level of the correlation using the feature of the unknown document to which the information indicating the level of the correlation based on the classification rule stored in the storage unit and used for classification of a document into a category of the second category system; and
outputting a classification result of the unknown document.

17. A document classification method, comprising;
extracting a feature from an unknown document;
judging certainty with which the unknown document belongs to each category of the first category system that includes a plurality of categories using a first classification rule stored in a storage unit and used for classification of a document into a category of the first category system and the feature extracted from the unknown document, and adding information about the certainty to the feature extracted from the unknown document;
classifying the unknown document into a category of a second category system including a plurality of categories that are different from the plurality of categories of the first category system based on a second classification rule stored in the storage unit and used for classification of a document into a category of a second category system using the feature of the unknown document to which the information about the certainty is added; and outputting a classification result of the unknown document.

* * * * *